United States Patent [19]
Osburn et al.

[11] 3,745,452
[45] July 10, 1973

[54] MAGNETIC FIELD GRADIENT APPARATUS AND METHOD FOR DETECTING PIPE LINE CORROSION

[76] Inventors: John U. Osburn, 5212 Berkman Drive, Austin, Tex. 78723; Donald R. White, Route 2, Box 76, Springfield Drive, Darnestown, Md. 20767

[22] Filed: Feb. 23, 1971

[21] Appl. No.: 118,033

[52] U.S. Cl. ............... 324/54, 324/43 R, 324/52
[51] Int. Cl. ..................... G01r 31/00, G01r 31/12
[58] Field of Search ................ 324/52, 54, 3, 67, 324/43

[56] References Cited
UNITED STATES PATENTS

| | | | |
|---|---|---|---|
| 2,758,276 | 8/1956 | Foerster | 324/43 R X |
| 3,617,865 | 11/1971 | Hakata | 324/67 |
| 2,501,598 | 3/1950 | Eltenton et al. | 324/67 |
| 2,382,743 | 8/1945 | Penther et al. | 324/67 |
| 3,526,831 | 9/1970 | Smith | 324/54 |

FOREIGN PATENTS OR APPLICATIONS

| | | | |
|---|---|---|---|
| 46,069 | 1/1963 | Poland | 324/41 |

*Primary Examiner*—Gerard R. Strecker
*Attorney*—Snyder & Butrum

[57] ABSTRACT

Electrical current patterns indicative of either the cathodic protection or the existence of external corrosion of a subsurface pipeline are detected by measuring the magnetic fields produced by electrical current flowing respectively into or exiting from the buried pipeline at the situs of a bare region of the pipeline at which corrosion may take place.

7 Claims, 6 Drawing Figures

PATENTED JUL 10 1973 3,745,452
SHEET 1 OF 2
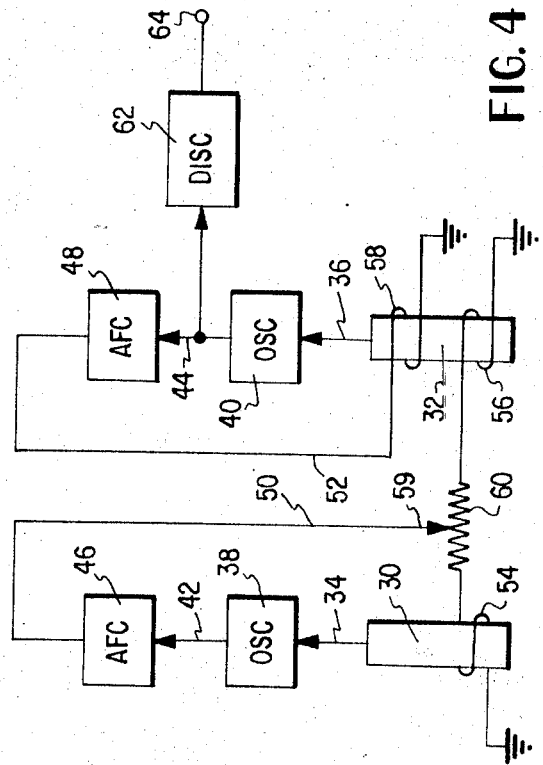
FIG. 3
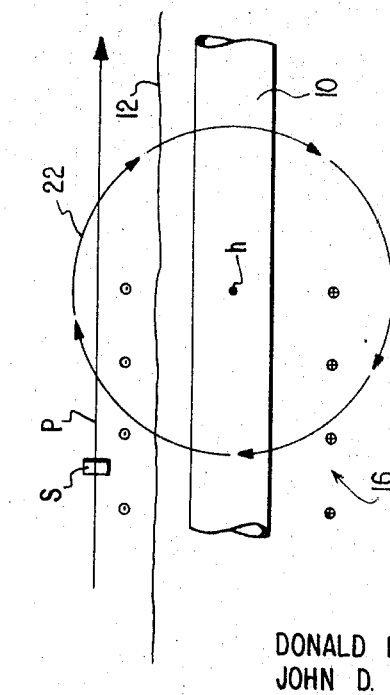
FIG. 4
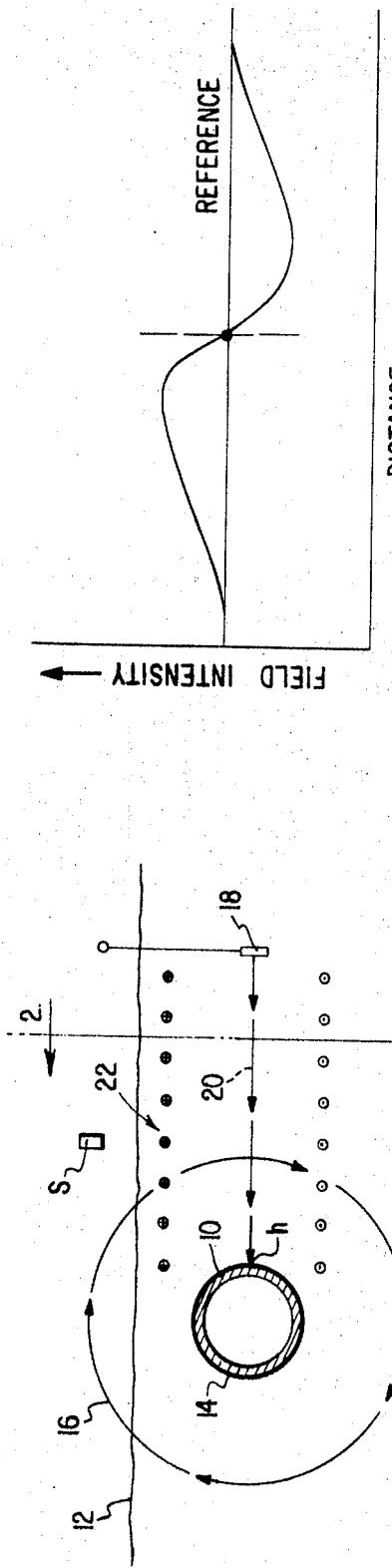
FIG. 1
FIG. 2
INVENTORS
DONALD R. J. WHITE
JOHN D. OSBURN

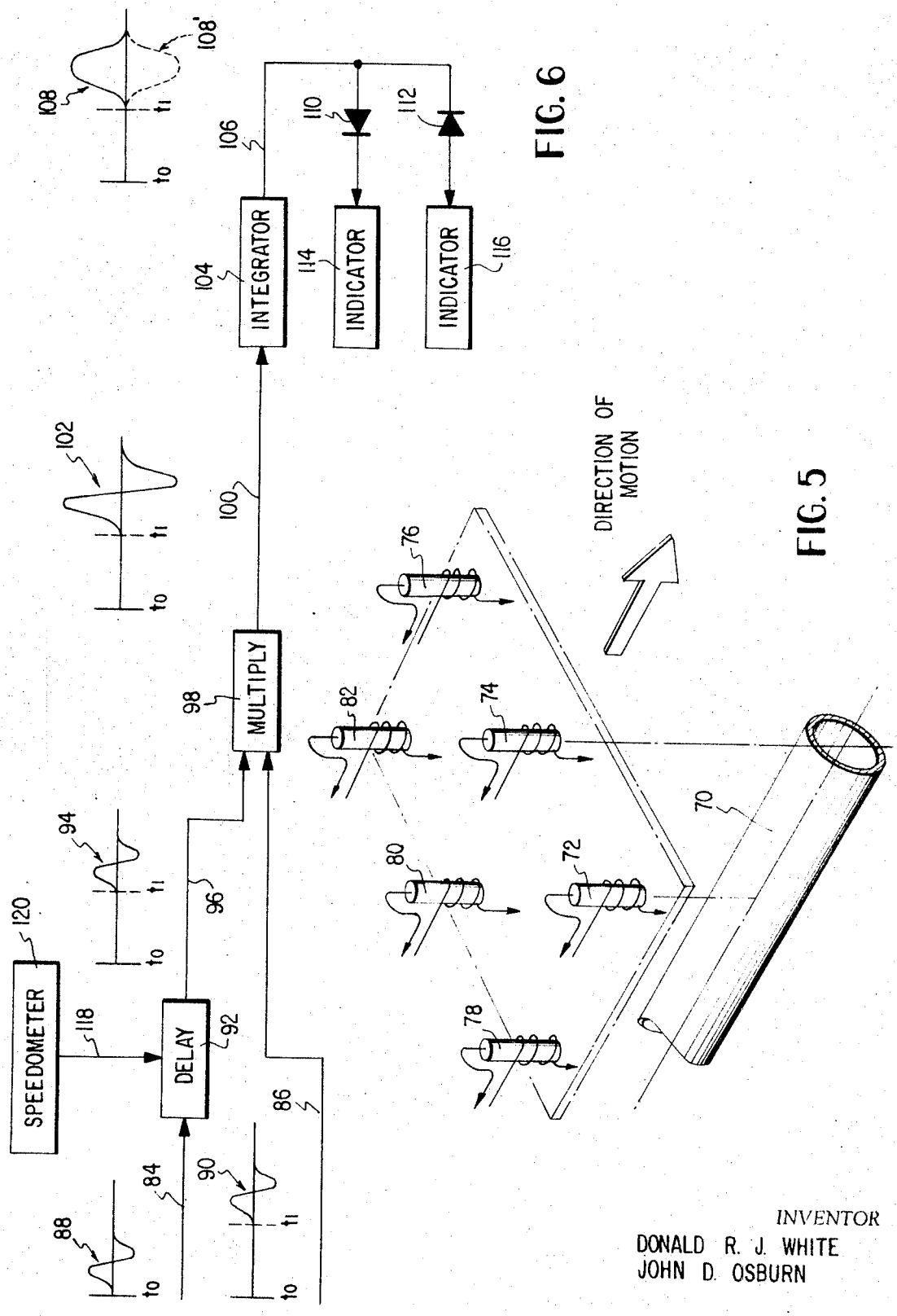

MAGNETIC FIELD GRADIENT APPARATUS AND METHOD FOR DETECTING PIPE LINE CORROSION

BACKGROUND OF THE INVENTION

Underground pipelines used for the transport of various fluids such as petroleum oil, natural gas, water and other products are subject to cathodic corrosive action which, in time, may give rise to product leakage and consequent contamination of and possible hazard to the surrounding region. To minimize this possibility in the first place, such pipelines are generally provided with an exterior covering or coating to protect them from direct contact with the soil or other medium. Since it is virtually impossible to assure that such protection will remain intact even at the time the pipe is laid, active electrical protection normally is employed.

This electrical protection, or cathodic protection as it is called, involves the installation of electrical current sources at selected points along the pipeline, each such current source normally being in the form of a full wave rectified 60 Hz power source connected at the positive terminal to the pipeline and at the negative terminal to a string of cathodes buried in the region of the pipeline. The power supplies are of low voltage, high current type and produce a D.C. output having a 120 Hz ripple superimposed thereon.

The reason for this cathodic protection is to prevent the flow of corrosion-causing current from a "holiday" (an exposed portion of the pipeline). The cathodic current bucks and should be of somewhat greater magnitude than the corrosion-causing current and is intended to assure that a holiday current, when it exists, will be in that condition preventing corrosive action on the pipe, i.e. flows into the pipe.

In a pipeline protected in the fashion described above, it is of interest to determine the magnitude and direction of holiday currents which may be flowing so that corrective action may be taken in the event that corrosive situations (current flowing out of the pipe) is indicated. For example, corrective action may take the form of boosting the protective cathodic current or by the installation of additional cathodic current power sources. There are existing methods for obtaining this information but they are based on ground-contact copper sulphate electrode measurement techniques which require a team of skilled operators and which, at best, allow for very slow survey progress.

BRIEF SUMMARY OF THE INVENTION

The present invention is directed to apparatus and methods which do not require ground contact to obtain the desired information and which allow very rapid survey progress to be made, all with a minimum of operators.

More specifically, the present invention involves the detection by magnetic field sensing mechanism of the presence, magnitude and direction of holiday currents which may be associated with an underground pipeline.

Essentially, the present invention utilizes means which is sensitive to variation of a magnetic field along a vertical axis to yield an output signal. This means is oriented above ground, generally over the pipeline, and is moved in the longitudinal direction of the pipeline so as to pass through the magnetic field associated with the current flowing at a holiday. Since the holiday current is a direct current and flows in a path having at least a vector component which is normal to the direction of movement of the sensing means, the sensing means "sees" a time-varying magnetic field which reverses its directional sense with respect to some reference level as the sensing means approaches, passes over and continues beyond a vertical plane passing through the holiday and normal to the pipeline. Thus, all holiday currents, whether flowing into or out of the pipe, will exhibit a unique signature due to the apparent reversal of the detected magnetic field which the sensing means sees in consequence of its sensitivity and the movement imparted thereto in the direction of the pipeline.

The present invention utilizes this unique signature characteristic to detect the presence of a holiday current amidst normal noise and spurious signals which occur inevitably under field conditions.

In a preferred embodiment of the invention, at least a pair of vertical axis sensing elements are associated in side-by-side relation with respect to the direction of movement imparted thereto. Output signal negative feedback circuitry associated with one sensing element which produces the system output exhibits slow response time as compared with the response time of the output signal negative feedback circuitry associated with the other or control sensing element. The feedback circuitry associated with this control sensing element is applied to the circuits of both sensing elements so that changes in the sensed ambient magnetic field which are due to movements of the sensing elements effectively are eliminated from the system output. On the other hand, the feedback circuits associated with both sensors eliminate the effects of steady magnetic fields and particularly of the earth's magnetic field.

With such an arrangement, magnetic gradients between the two sensors which are within the frequency response of the system output sensor will be detected. Thus, by maintaining an orientation of the two sensors as they are moved along the direction of the pipeline, such that the control sensor does not see the magnetic fields associated with holiday currents whereas the system output sensor does, the resultant holiday current signature gradients appear as system outputs.

BRIEF DESCRIPTION OF THE DRAWING FIGURES

FIG. 1 is a vertical section transversely through a subsurface pipe and illustrating certain principles of the invention;

FIG. 2 is a section taken along section line 2—2 in FIG. 1;

FIG. 3 is a graph showing the general wave form of an output signal indicative of a holiday current;

FIG. 4 is a block diagram illustrating circuit components of an embodiment of the invention;

FIG. 5 is a perspective view showing the layout of sensors and their direction of movement with respect to a subsurface pipe in a preferred embodiment of the invention; and FIG. 6 is a block diagram illustrating a preferred form of signal processing system.

DETAILED DESCRIPTION OF THE INVENTION

The principles basically underlying the present invention are illustrated in FIGS. 1 and 2 wherein a pipeline 10 lying beneath the surface 12 is illustrated as having a protective covering 14 which normally insulates the pipeline from electrical connection with the electrically conductive material within which it is buried. The pipeline as illustrated is cathodically protected so that an electrical current flows unidirectionally with respect to the pipeline, giving rise to a magnetic field therearound as is illustrated diagrammatically at 16. The direction of the cathodic current is assumed to be into the page so that this magnetic field is in the clockwise direction as shown in FIG. 1.

A subsurface anode 18 forming part of the cathodic protection circuit is illustrated in laterally normal relation to a discontinuity or holiday in the protective covering 14 so that an electrical current or holiday current flows between the anode 18 and the pipeline as indicated by the dashed line 20. This unidirectional holiday current has been illustrated arbitrarily to be in the direction indicated by the arrows in FIG. 1 since for an understanding of the invention, either direction may be chosen.

FIG. 2 illustrates the magnetic field 22 associated with the holiday current, same being in the clockwise direction because of the direction of holiday current flow arbitrarily chosen as above.

Since the magnetic field intensity varies inversely with the distance from the current path 20, a magnetic sensing device S moving along the path P of FIG. 2 which is located laterally of the pipeline (FIG. 1) so as to pass through the field 22 and which sensor is oriented with its sensitive axis vertically disposed will "see" a variation in gradient field intensity akin to the idealized representation of FIG. 3. That is, upon approaching the holiday h from the left in FIG. 2, the gradient field intensity first increases in one direction and then decreases to zero for that field when directly above the holiday h, and then increases in the opposite direction as it passes to the right beyond the holiday and then returns to the reference level, as shown. Ideally, the field intensity passes through zero for the holiday current field when the sensor is directly above the holiday and is of opposite directions on either side of this point due to the closed nature of the flux lines which are centered about the current path 20. Thus, each holiday current produces a definite signature which may be identified easily.

Bearing the above in mind, and with reference to FIG. 4, a pair of sensors 30 and 32 are shown, of which the sensor 30 is to be disposed above the surface substantially over the subsurface pipeline so that it will "see" little, if any, of the magnetic fields associated with holiday currents whereas the sensor 32 is disposed laterally thereof for exposure to such magnetic fields as is the case with the sensor S in FIGS. 1 and 2. These sensors preferably are of the type disclosed in U.S. Pat. Nos. 3,319,161 or 3,461,387, for example, and are aligned with their sensitive axes generally vertically disposed. The usual windings of these sensors are not shown, for the sake of clarity, but it will be understood that each has an output identified at 34 and 36 for controlling the frequency of an associated oscillator 38 or 40. The outputs 42 and 44 of these oscillators are applied to automatic frequency control circuits 46 and 48 respectively, each of which has a feedback path 50 or 52 to one or the other or both sensors, as will now be explained.

Each of the two sensors is provided, in addition to the normal windings, with a winding 54 or 56 which windings are wound upon the respective sensors such that the field created thereby in response to the magnetic field seen by the sensor 30 will cancel the field seen within limits as hereinafter set forth. The movable tap 59 of the potentiometer 60 is adjusted to compensate for variations in the sensitivities of the two sensors and the system thus does not require carefully matched sensor components.

The response of the automatic frequency control circuit 46 is such that at frequencies less than about 5000 Hz, the magnetic signals sensed by the sensor 30 are nulled by the output of the circuit 46 through the coils 54 and 56. Above this frequency, such nulling does not take place.

The response of the automatic frequency control circuit 48 is such that its frequency cut-off is much lower than that of the circuit 46 so that relatively slowly varying gradients existing between the two sensors whose frequencies are higher than such cut-off manifest themselves as outputs of the sensor 32. The feedback winding 58 for the sensor 32 thus nulls those gradients whose frequency is lower than the cut-off of the circuit 48. The discriminator 60 may be provided to produce an analog output at the terminal 62 which is proportional to the frequency modulated output signal from the oscillator 40.

The use of the feedback windings 54 and 56 driven by the circuit 46 allows the system to operate without concern as to sensor orientations in the earth's magnetic field. The potentiometer 60 allows unmatched sensors to be employed, and the upper frequency response of the system is determined by the characteristics of the circuit 48.

It will be understood that the output signals from the oscillators 38 and 40 are frequency modulated signals proportional to the changes in inductance of the input coils or windings of the sensor, which changes in inductance are due to variations in the H fields seen by the sensors. Conventionally, these input windings are associated with the tank circuits of the respective oscillators 38 and 40 so that the output frequencies thereof vary linearly with changes in inductance.

As described in the above-mentioned patents, each sensor is a flux gate magnetometer in which a body of magnetically saturable material is used in conjunction with a pair of input windings to provide the necessary variable inductance effects for controlling the oscillator.

A preferred arrangement of sensors is illustrated in FIG. 5 wherein a portion of a subsurface pipe 70 is shown with the six sensors 72, 74, 76, 78, 80 and 82 disposed in the array shown and being moved above the surface in the direction shown, i.e., longitudinally of the pipe 70. The sensors are rigidly mounted with respect to each other and, for that purpose, may be fixed upon a suitable platform supported from a vehicle, such as a truck, so as to be moved along from above the surface beneath which the pipe 70 lies.

It will be appreciated that the sensors 74 and 80 are aligned vertically above the center line of the pipe 70 with the two sensors 76 and 82 disposed to one side of the pipe and the sensors 72 and 78 disposed to the other side of the pipe. Thus, the sensors 74 and 80 each correspond to the sensor 30 of FIG. 4 and the two sensors 72 and 76 are associated with the center sensor 74 and each is connected thereto in the manner shown for the sensor 32 in FIG. 4. Likewise, the sensors 78 and 82 are associated with the rear center sensor 80 and each is connected thereto in the manner shown for the sensor 32 in FIG. 4. The two sets of sensors 72, 74, 76 and 78, 80, 82 are fixed in parallel rows and the corresponding center, right and left sensors of the two sets are aligned with each other longitudinally with respect to the direction of movement. Thus, the left sensors 76,82 "see" conditions on the left-hand side of the pipe 70 whereas the right sensors 72,78 "see" those on the right-hand side of the pipe.

The entire assemblage is mounted on a common support which may be, for example, carried by a motor vehicle so as to be disposed laterally to one side or the other thereof. In this way, the vehicle may progress along the usual access road paralleling the subsurface pipeline while maintaining the sensor assembly properly positioned with respect to the pipeline. For the purpose, it is contemplated that the sensor assembly may be carried by a boom mounted on the vehicle, which boom is capable of raising and lowering, swinging, and extending-retracting the sensor assembly relative to the vehicle.

FIG. 6 illustrates a preferred form of processing circuit to be used with each of the right-hand and left-hand sensors. For the purpose of clarity, only the processing circuit for the left-hand sensors is shown in FIG. 6, that for the right-hand sensors being identical thereto. In FIG. 6, the conductor 84 corresponds to the conductor 44 leading to the discriminator 62 in FIG. 4 in association with the signal obtained from the sensor combination 74,76 (FIG. 5). Likewise, the conductor 86 corresponds to the signal obtained from the sensor combination 72,74 of FIG. 5.

Since the front or leading sensor 76 will pass over a holiday first, the holiday signal or signature 88 will lead the signature 90 in the time domain. To secure synchronization of these two signatures, the signature 88 is delayed by the means 92 which is adjustable as to its delay in proportion to the velocity of sensor movement, thereby to produce the delayed signature 94 in synchronism with the signature 90. The two signatures are applied at the conductors 86 and 96 to the multiplier 98 to provide, at its output conductor 100, the composite signal 102. The signal 102 is applied to an operational integrator 104 to produce a signal of the nature indicated at 108. It will be appreciated that the signal 108 will be positive for one direction of holiday current flow which produces the signatures 88 and 90, but will be negative as indicated at 108' if the signatures 88 and 90 are inverted due to the opposite polarity of the holiday current.

Thus, two indicating systems 114 and 116 are used in conjunction with oppositely poled diodes 110 and 112 so that the system 114 responds to positive signals 108 and the system 116 responds to negative signals 108'. This of course identifies the polarity of the holiday current and, for this purpose, each system 114 and 116 may include a polarity-indicating light.

Since the magnitude of the signatures 88 and 90 will be proportional to the magnitude of holiday current, each indicating system 114 and 116 includes an instrumentality to determine the magnitude of the signal 108 or 108'. A recording voltmeter or ammeter is suitable for this purpose. It may also be advantageous to provide a permanent record of the location, direction and magnitude of holiday currents, in which case a record paper may be advanced in consonance with vehicle speed and the direction and magnitude of holiday currents marked thereon.

The delay circuit 92 is controlled from a suitable vehicle speed-responsive device such as the speedometer 120 having an output 118 which controls the amount of delay in proportion to vehicle speed. Since for a vehicle mounted unit the delay time required may be of substantial duration, the delay device 92 advantageously may be a magnetic tape record-playback unit in which either the tape speed or the spacing between the record and read heads may be varied according to vehicle speed.

What is claimed is:

1. The method of surveying subsurface pipe to locate a discontinuity which may be present in a protective covering on the pipe by detecting electrical current flowing through such a discontinuity, which comprises the steps of:
    a. orienting at least a pair of axially directional magnetic field sensors above the surface with their sensing axes essentially vertically disposed and with one sensor located essentially in alignment above the pipeline and the other sensor displaced laterally thereof whereby said one sensor lies essentially outside the magnetic field associated with holiday currents which may be flowing to and from the pipeline while said other sensor may pass through such magnetic fields;
    b. translating the sensors longitudinally with respect to the subsurface pipe While maintaining the orientation of step (a); and
    c. detecting only those magnetic field gradients occurring between said sensors during the translation of step (b) which are due to the Presence of magnetic fields associated with electrical currents flowing generally perpendicular to said pipeline.

2. The method of detecting electrical current patterns indicative of externally corroded regions of subsurface pipeline having cathodic current impressed thereon, which comprises the steps of:
    a. orienting at least a pair of axially directional magnetic field sensors above the surface with their sensing axes essentially vertically disposed and with one sensor located essentially in alignment above the pipeline and the other sensor displaced laterally thereof whereby said one sensor lies essentially outside the magnetic field associated with hollday currents which may be flowing to and from the pipeline while said other sensor may pass through such magnetic fields;
    b. translating said sensors along the direction of the pipeline while maintaining the orientation of step (a); and
    c. detecting only those magnetic field gradients occurring between said sensors during the translation of step (b) which are due to the presence of magnetic fields associated with electrical currents flowing generally perpendicular to said pipeline.

3. The method according to claim 2 including the steps of:
    a. orienting a second pair of axially directional magnetic field sensors above the surface with their sensing axes essentially vertically disposed and in trailing relation to respective ones of the first pair of sensors;

b. translating said second pair of sensors along the direction of the pipeline while maintaining the orientation of step (a);

c. detecting only those magnetic field gradients occurring between said second pair of sensors which are due to the presence of magnetic fields associated with electrical currents flowing generally perpendicular to said pipeline; and combining the detected gradients of the two pairs of sensors in time-coincident relation.

4. Apparatus for translation along a path generally parallel to the axis of and to detect electrical current patterns indicative of corroded regions of a subsurface pipeline, comprising in combination:

a pair of magnetic field sensors disposed in laterally spaced relation to each other with respect to said path, each sensor having a sensitive axis and the sensitive axes of the two sensors being disposed generally vertically;

first feedback means connecting the output of one of said sensors as inputs to both of said sensors for nulling variations in magnetic field sensed by said one sensor which are below a first selected frequency, said first frequency being sufficiently high as to obviate effects of gross magnetic fields such as earth's magnetic field due to movement of the sensors; and second feedback means connecting the output of the other of said sensors as an input to said other sensor for nulling variations in magnetic field sensed by said other sensor which are below a selected second frequency, said second frequency being lower than said first frequency by an amount sufficient to produce an output from said other sensor include of polarity-indicating in the difference between the magnetic field gradients sensed by said two sensors due to movement of said other sensor through magnetic fields produced by electrical currents flowing generally perpendicular to the path of movement of said sensors.

5. Apparatus as defined in claim 4 including means for translating said sensor along a path generally parallel to but above a subsurface pipeline with said one sensor disposed generally above the axis of the pipeline and said other sensor disposed laterally with respect to the pipeline.

6. Apparatus for translation along a path generally parallel to the axis of and to detect electrical current patterns indicative of corroded regions of a subsurface pipeline, comprising in combination:

a pair of magnetic field sensors disposed in longitudinally spaced relation to each other with respect to said path, each sensor having a sensitive axis and the sensitive axes of the two sensors being generally vertically disposed;

means for translating said sensors along said path in laterally displaced position with respect to the pipeline and at a selected speed;

means connected to the output of the leading sensor for delaying such output in accord with the spacing between sensors and said selected speed so as to bring the outputs of the two sensors into coincidence;

means for combining the outputs of said sensors to detect magnetic field variations produced by movement of said sensors through magnetic fields associated with electrical currents flowing generally perpendicular to said path;

a second pair of sensors mounted on said means for translating, one sensor of said second pair being disposed with its sensitive axis generally vertical and located laterally of said leading sensor and the other sensor of said second pair being disposed with its sensitive axis generally vertical and located laterally of the trailing sensor of the first pair of sensors;

first feedback means connecting the output of said one sensor as inputs to said one sensor and said leading sensor for nulling variations in magnetic field sensed by said one sensor which are below a selected first frequency, said first frequency being sufficiently high as to obviate effects of gross magnetic fields such as earth's magnetic field due to movement of said one and said leading sensors;

second feedback means connecting the output of said leading sensor as an input to such leading sensor for nulling variations in magnetic field sensed by said leading sensor which are below a selected second frequency, said second frequency being lower than said first frequency by an amount sufficient to produce an output from said leading sensor indicative in variations in the difference between the magnetic field gradients sensed by said leading sensor and said one sensor due to movements of said leading sensor through magnetic fields produced by electrical currents flowing generally perpendicular to said path;

third feedback means connecting the output of said other sensor as inputs to said other sensor and said trailing sensor for nulling variations in magnetic field sensed by said other sensor which are below said first frequency;

fourth feedback means connecting the output of said trailing sensor as an input to such trailing sensor for nulling variations in magnetic field sensed by said trailing sensor which are below said second frequency; and said second pair of sensors being oriented to move generally vertically above the axis of the pipeline.

7. Apparatus according to claim 6 including a third pair of sensors mounted on said means for translating, said third pair of sensors having their sensitive axes generally vertically disposed and being disposed in longitudinally spaced relation to each with respect to said path in minor image relation to said leading and trailing sensors relative to said second pair of sensors;

said first feedback means also being connected as an input to the leading sensor of said third pair and said third feedback means also being connected as an input to the trailing sensor of said third pair;

fifth feedback means connecting the output of said leading sensor of the third pair as an input to such leading sensor for nulling variations in magnetic field sensed thereby which are below said second frequency;

sixth feedback means connecting the output of the trailing sensor of said third pair as an input to such trailing sensor for nulling variations in magnetic field sensed thereby which are below said second frequency;

means connected to the output of said leading sensor of said third pair for delaying such output in accord with the spacing between the sensors of said third pair and said selected speed so as to bring the outputs of said third pair of sensors into coincidence; and means for combining the outputs of the sensors of said third pair to detect magnetic field variations produced by movement of said third pair of sensors through magnetic fields associated with electrical currents flowing generally perpendicular to said path.

* * * * *